H. P. CHILDRESS.
BALE TIE BUCKLE.
APPLICATION FILED APR. 7, 1914.
1,121,801.
Patented Dec. 22, 1914.
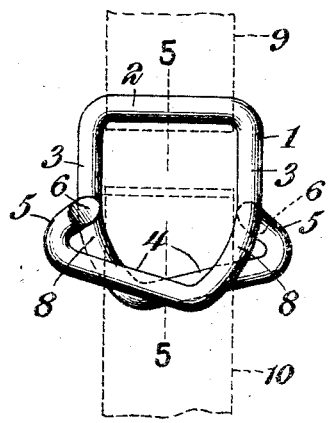
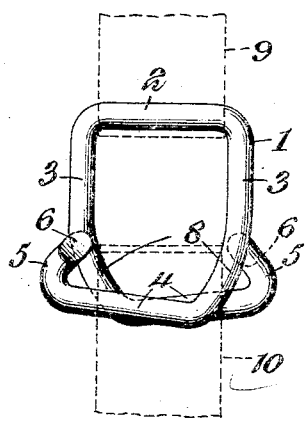
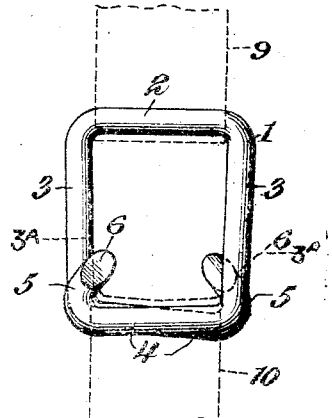
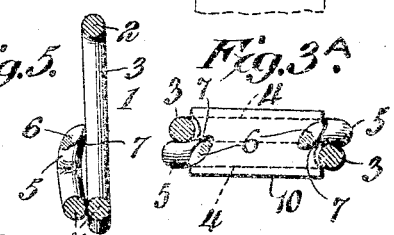
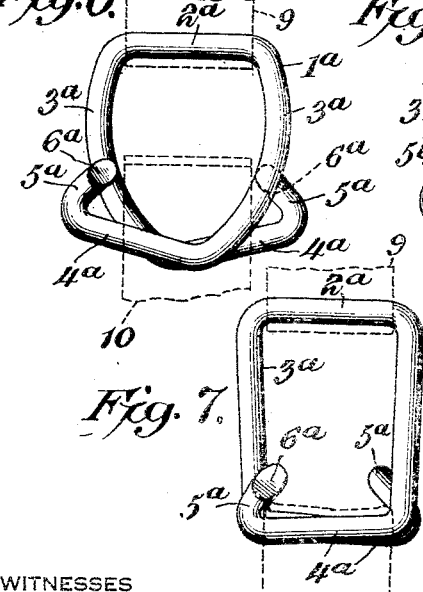
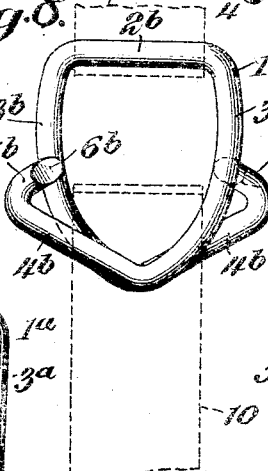
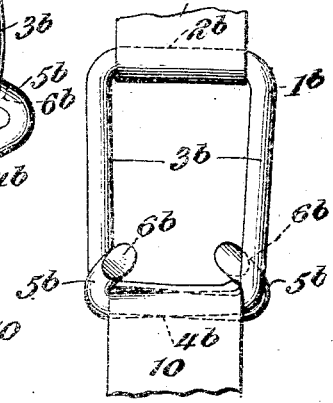
Henderson P. Childress,
INVENTOR,
WITNESSES
Howard D. Orr
F. T. Chapman
BY
ATTORNEY

UNITED STATES PATENT OFFICE.

HENDERSON PIRCE CHILDRESS, OF MEMPHIS, TENNESSEE.

BALE-TIE BUCKLE.

1,121,801. Specification of Letters Patent. Patented Dec. 22, 1914.

Application filed April 7, 1914. Serial No. 830,196.

*To all whom it may concern:*

Be it known that I, HENDERSON P. CHILDRESS, a citizen of the United States, residing at Memphis, in the county of Shelby and State of Tennessee, have invented a new and useful Bale-Tie Buckle, of which the following is a specification.

This invention has reference to improvements in bale tie buckles, and its object is to provide a buckle to which the band may be expeditiously applied without liability of improper union of the band and buckle and which when the buckle is subjected to the expansive force of a highly compressed bale becomes locked to the band against disengagement therewith under the application of any force short of that causing a rupture of the buckle.

In accordance with the present invention the buckle is adapted for use with the ordinary flat bale bands of strap iron or steel with the ends returned upon themselves to form loops encircling the opposite ends of the uniting buckles, with the free ends of the loops against the bale. Such bale bands are known as tucked-in bale bands, where the free ends of the loops are covered by the main portion of the band, thereby avoiding injury to other bales or articles or to the handlers of the bales from exposed ends of the bands.

The present invention has to do with a type of buckle made of a piece of wire of suitable gage bent into a substantially closed loop, of which one end constitutes a lapped entering end where the loops of the bale band may be introduced into the buckle, and then the expansive force of the tightly compressed cotton or other bale closes the looped end to prevent the escape of the band.

The present invention has to do with the same general type of buckle shown and described in application No. 805,992, filed by me on December 11, 1913, for improvements in bale tie buckles, and in said application claims are made to the broad features which enter into the buckle of the present invention, so that with respect to such broader features no claim is made in this application, the claims in this case being limited to certain improvements represented by the present buckle over the buckles shown, described and claimed in the aforesaid application.

In accordance with the present invention the terminal portions of the lapped parts of the entering end of the buckle are formed into return hooks; that is, these ends are bent upon themselves toward each other and toward the central portion of the buckle so as to overhang to a certain extent the portions of the lapped ends upon which they are formed, these hooks being directed toward the closed end of the buckle, that is, the end remote from the lapped end. Thus far the buckle is similar to the buckles shown and described in the aforesaid application, but the present buckle differs from those shown in the said application in that the sides of the buckle are bent toward each other, so as to approach at the lapped end in a manner to carry the hooked extremities toward the closed end of the buckle with the lapped portions crossing at an angle one to the other. The arrangement is such that when the buckle has been applied to one end of the bale band and the loop at the other end of the bale band is introduced into the buckle through the lapped end and the buckle is brought into alinement with the two lapped ends of the bale band, the side edges of the loop engage the approaching sides of the buckle as the said loop is moved toward the entering end, and as these approaching sides are normally closer together than the width of the band, such approaching sides are caused to recede one from the other, thus drawing the hooked ends toward each other and into engagement with the side edges of the band with the return portions of the hooks overlying that face of the band at the loop then presented toward the closed end of the buckle.

The tendency of the expanding bale is not only to straighten out the sides of the buckle, but to bend the lapped ends at their point of junction with the sides of the buckle to an extent to move the free extremities away from the closed end of the buckle, and unless the gage of the wire be extremely heavy, a lapped end buckle not bent at the extremities in the form of return hooks would readily pull out under the great strain of the expanding bale. However, with the buckle of the present invention the return hooks not only engage the edges of the bale band, but override that face of the bale band presented toward the inside of the buckle and no force can be applied to the bale band, in the direction of its length, which is sufficient to bend out the hooks and so release the band. In fact, a force destructive to either the band or the buckle is insufficient to straighten the hooked extremities.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a plan view of a buckle embodying the present invention. Fig. 2 is a view similar to Fig. 1 but showing the buckle partly extended. Fig. 3 is a view similar to Fig. 1 but showing the buckle fully extended as it would under the expansive force of a bale. Fig. 3ª is a section on the line 3ª—3ª of Fig. 3. Fig. 4 is an edge view of the buckle of Fig. 1 looking from the closed end. Fig. 5 is a section on the line 5—5 of Fig. 1. Fig. 6 is a view similar to Fig. 1 but showing a slightly different form of the buckle. Fig. 7 is a view similar to Fig. 6 showing the buckle in the extended and locked position. Fig. 8 is a view similar to Fig. 1 and showing a still further modification of the form of buckle. Fig. 9 is a view similar to Fig. 7 but showing the form of buckle illustrated in Fig. 8.

Referring to the drawings there is shown in Fig. 1 a buckle 1 composed of a single piece of wire, the word wire being used as descriptive of the material commonly known as wire, and also of any bar, strand, rod or other similar piece of metal of suitable cross-section and gage for the purposes of the present invention. The buckle 1 comprises an end bar or member 2, side bars or members 3 and another end bar or member made up of extensions 4 of the respective side bars 3, so arranged with respect to the side bars 3 that these extensions 4 normally cross at an angle one to the other, but, as will hereinafter appear, the extensions 4 when the buckle has a bale band applied thereto, closely overlap one another. Each extension 4 terminates at the end remote from the side 3 from which it projects in a return hook 5; that is, the hook 5 is bent into overriding relation to the respective extension 4, and at the same time is directed toward the center part of the buckle, or toward the permanently closed end of the buckle, and furthermore the hooks are so bent as to be directed one toward the other. This means that each hook 5 is directed toward the side of the buckle from which the extension 4 projects at an acute angle to the extension 4 carrying it. Each hook 5 is in the normal condition of the buckle 1 unapplied to a bale band, located adjacent to the side of the loop constituting the buckle remote from the side from which the extension 4 carrying the hook projects, and also is located on the same face of the loop as a whole as that occupied by the side 3 from which the extension 4 carrying the hook projects, wherefore each hook and its extension 4 may move in a plane substantially parallel with the general plane of the body of the buckle 1 toward and from the center line of the buckle, which is substantially parallel with the sides 3 and perpendicular to the end 2, which center line would agree in position with the section indicating line 5—5 of Fig. 1.

The outer sides or faces of the hooks 5, that is, those faces remote from the general plane of the buckle 1, are beveled, as indicated at 6, so that the extreme ends of the hooks are relatively thin and lie closely adjacent to the corresponding sides of the buckle, and in order to insure such close relation these beveled ends of the hooks may have a slight bend toward the respective side bars of the buckle against which they lie, as indicated at 7, and best shown in Fig. 5.

In Fig. 1 the buckle loop is in close approach in shape to a rectangle of substantially square outline, but each side 3 for about one-third, more or less, of the distance from the respective extension 4 is bent toward the longitudinal center line of the buckle corresponding to the section line 5—5 of Fig. 1, as indicated at 8, so that near the entering or lapped end of the buckle loop the sides 3 approach, although for the greater portion of their length from the closed end 2 the sides of the buckle are about parallel. They may be actually parallel, but absolute parallelism is not demanded.

In the normal form of the buckle, that is in the form ready for the application of a bale band, the extensions 4 cross each other at an obtuse angle with the return hooks 5 closer to the end 2 of the buckle loop than are the points of crossing of the extension 4.

The free ends of the hooks are adjacent to the junction of the bends 8 with the main or straight portions of the sides 3 and are so separated one from the other that a bale band may be introduced into the buckle 1 and then moved toward the lapped end and be brought into edge engagement with the curved portions 8 without engagement with the extremities of the return hooks 5. The hooks may be entirely outside of the body of the buckle or may have their taper ends 6 in part overlapping those portions of the sides of the buckle to which they are adjacent, or they may be arranged in any other way so long as a bale band introduced into the buckle and moved toward the lapped end of the buckle will not engage such free ends, but will pass by them toward the lapped end.

While the bale band is in the form of a continuous strap, it is formed at the opposite ends into loops by returning an appropriate portion of each end upon itself, and for convenience of description these two ends are separately designated by reference numerals 9 and 10, respectively. The loop 9 may be introduced into the buckle through the lapped end, and then either the band or the buckle be so moved that the looped end 9 of the band is in encircling relation to the end bar 2 constituting the permanently closed end of the buckle.

When the bale band is applied to a highly compressed bale with the buckle already in position with respect to the loop 9, the loop 10 of the band is readily introduced into the buckle by being moved through one side of the lapped end, the natural spring of the buckle permitting it to yield sufficiently for this purpose, and the introduction of the loop 10 is accomplished by turning the buckle on its center through an arc of about ninety degrees. Now, with the loop 10 of the band fully introduced into the buckle, the latter is rotated in the opposite direction until the band 9 encircles or houses the end member or bar 2, and the band 10 encircles or houses the lapped extensions 4 constituting the entering end of the buckle, but the loop 10 first engages the approaching or curved sides 8 of the buckle at a short distance from the lapped ends but closer thereto than the extremities of the hooks 5. When the pressure upon the bale is released the bale band is extended due to the swelling of the bale and the opposite edges of the loop 10 where encircling the entering end of the buckle are moved along the approaching portions 8 of the sides 3, and thereby cause the sides to recede one from the other, and at the same time this causes the hooks 5 to approach one toward the other, but with their extreme ends closer to the closed end 2 than is the looped end of the bale band at the time. This position of the parts is indicated in Fig. 2, and it will be seen therefrom that the return hooks 5 are already partially overhanging the opposite edges of the loop 10 of the band on the face of the loop 10 toward the closed end 2 of the buckle. As the expansion of the bale continues the lapped end of the buckle continues to spread because of the separation of the approaching ends of the sides 3 due to the action of the bale band thereon, and this action proceeds until the bases of the hooks 5 where joining the extension 4 come into contact with the side edges of the loop 10 of the bale band, and the extremities of the hooks 5 are considerably closer together than the width of the bale band. Since the sides 3 of the buckle will then no longer separate, such movement being arrested by the engagement of the hooks 5 with the edges of the bale band, the expansive force of the bale is exerted in straightening out the sides 3 so that the bends 8 are in large part obliterated and the extensions 4 are brought into close overlapping relation and a close approach to parallelism. However, the return bends of the hooks 5, since these hooks 5 are in acute angle relation to the extension 4 and are directed one toward the other, bring the free ends of the hooks into overriding relation to that face of the loop 10 of the band toward the other or closed end of the buckle. Now, the expansive force of the bale would in the absence of the hooks tend to bend the extension 4 away from the closed end 2 of the buckle, but this tendency is effectually prevented by the overhanging ends of the hooks engaging around the opposite edges of the bale band and over that face of the band toward the closed end of the buckle. With such a buckle either the bale band or the buckle will rupture before the hooks will yield in the least to permit opening up of the buckle, and the escape of the band. The return hooks embracing the sides and overhanging the face of the band form an effective and positive lock becoming automatically effective by the expansive force of the bale. Since it is customary to make the buckles of relatively soft metal having so little inherent elasticity that such elasticity is negligible, the buckle readily holds its shape when once subjected to the great expansive force of the bale, and should the tension be relieved the buckle will still remain in the locking relation to the band into which it was forced by the initial expansion of the bale when relieved from pressure, and with the band and buckle in position. The position assumed by the buckle in Fig. 1 under the full expansive force of the bale is illustrated in Fig. 3.

In Fig. 6 there is shown a buckle 1ª quite similar to the showing of Fig. 1; that is, it is provided with an end bar 2ª constituting the normally closed end of the buckle, side bars 3ª, each terminating at the end remote from the bar 2ª in an extension 4ª, said extension 4ª constituting the other end bar of the buckle and overlapping as in Fig. 1, and each extension 4ª terminates at the end remote from the side 3ª from which it projects in a return acute angle hook 5ª having a beveled extremity 6ª, all as in Fig. 1, except that the sides 3ª have a generally continuous curve from the bar 2ª to the extensions 4ª, the side bars or members 3ª receding as they leave the bar 2ª, and then approaching so that where they are joined by the extensions 4ª they are closer together than the length of the bar 2ª and are also closer together than the width of the bale band to which the buckle is to be applied. The proportions are such that a bale band loop corresponding to the loop 10 of Figs. 1, 2 and 3 will engage the inner edges of the side bars 3ª at points sufficiently close to the lapped end of the buckle to be out of the way of the approaching free ends of the acute angle hooks 5ª as the sides 3ª are pressed apart. The operation of the structure of Fig. 6 is in the main the same as that of Fig. 1 and the buckle assumes a slightly elongated and more nearly rectangular form shown in Fig. 7 when under the full expansive force of the bale, much the same as occurs with the structure of Fig. 1, and the return hooks 5ª lock over and about the opposite edges of the loop 10 of the bale band in partial overriding relation to that face of the band toward the closed end member or bar 2ª.

In Fig. 8 there is shown a bale buckle 1ᵇ similar to the structure of Fig. 6, and comprising an end bar 2ᵇ, side bars 3ᵇ, extensions 4ᵇ, and return hooks 5ᵇ with beveled portions 6ᵇ. The structure of Fig. 8 differs from that of Figs. 1 and 6 in that the side bars 3ᵇ are somewhat longer and the extensions 4ᵇ have more nearly a right angular relation with respect to the side bars 3ᵇ than in Figs. 1 and 6. The structure of Fig. 8 when extended as shown in Fig. 9 forms a somewhat longer rectangle than with the buckles of the other figures, and, therefore, permits a somewhat greater elongation of the bale band than with the structures of the other figures. The general operations and functions are, however, the same in all the various forms.

The hooks 5, 5ª and 5ᵇ may be either straight or rounded from their root ends toward their free ends, and since these hooks should be return hooks, that is, should each overhang more or less the extension carrying it, and each hook should be directed toward the other as well as toward the center portion of the buckle loop in a direction toward the other or closed end of the loop, the term acute angle hook is used as descriptive of such a return hook whether the hook from its root portion to its point or extremity be straight or substantially straight or curved.

An important feature of the present invention is the construction of the sides of the loop of the buckle in that these sides approach toward the lapped end of the buckle to such an extent that the side bars of the buckle are less separated than the width of the band to which the buckle is applied. The parts are so proportioned that as the band travels along these approaching sides of the buckle in moving toward the lapped end of the buckle under the expansive force of a bale, the buckle is thereby so spread as to bring the return hooks at their root ends into side engagement with the side margins of the band, and at the same time the free ends of the acute angle hooks approach closer than the width of the band into overriding relation to the band on that face thereof toward the other end of the buckle. The expansive force of the bale causes the buckle also to straighten out until it has acquired a limited elongation bringing the hooks into close locking relation to the band and further elongation is arrested, for the return or acute angle hooks effectively stop any further elongation of the buckle and wholly prevent any possibility of the buckle opening or spreading, and so releasing the band.

What is claimed is:—

1. A bale band buckle of loop form comprising an end bar, two side bars, and two other end bars formed by extensions of the side bars and constituting the entering end of the buckle, the last-mentioned end bars being each substantially equal in length to the first-mentioned end bar and each terminating in an inwardly directed hook, and said last-mentioned end bars crossing each other in opposite directions at an angle one to the other so as to space the hooks a distance apart greater than the width of the band, whereby the tension exerted by the band on the crossed bars will cause the side bars to straighten out and the crossed bars to overlap and at the same time bring the hooks into locking engagement with the side edges of the band.

2. A bale band buckle of loop form comprising an end bar, two side bars, and two other end bars formed by extensions of the side bars and constituting the entering end of the buckle and each terminating in an inwardly directed or return hook, the side bars approaching toward the entering end of the buckle into closer relation than the width of the bale band, and the second-named end bars crossing each other in opposite directions at an angle, with the hooks spaced apart a greater distance than the width of the band, whereby the tension exerted by the band against the approaching portions of the side bars and upon the crossed bars will cause the side bars to straighten out and the crossed bars to overlap and at the same time cause the hooks to approach to bring them into locking engagement with the side edges of the band and with the extremities of the hooks closer together than the width of the band.

3. A bale band buckle of loop form comprising an end bar, two side bars and two other end bars formed by extensions of the side bars and constituting the entering end of the buckle, the side bars being curved one toward the other as they approach the entering end of the buckle to there bring them into closer relation than the width of the band, and the second-named end bars being each of a length substantially that of the width of the band and terminating in an inwardly directed or return hook, said bars crossing each other in opposite directions at an angle, with the hooks exterior to the inner margin of the side bars and located between the first-named end of the buckle and the entering end, and being also spaced apart a greater distance than the width of the band, whereby the tension of the band exerted on the side bars of the buckle will cause such side bars to straighten out and the crossed end bars to overlap, and at the same time cause the hooks to approach into locking engagement about the side edges of the band with the free ends of the hooks closer together than the width of the band.

4. A one-piece bale band buckle of loop form comprising an end bar, two side bars, and two other end bars formed by extensions of the side bars and constituting the entering end of the buckle, the said side bars approaching one toward the other toward the entering end of the buckle until they are closer together than the width of the bale band, and the second-named end bars crossing each other in opposite directions at an angle and each terminating in a return hook directed toward the central portion of the loop, with the hooks located between the two ends of the buckle and with their inner ends outside the inner margins of the sides of the buckle and at a greater distance apart than the width of the bale band, said last-named bars being also between the base of the hook and the side bar carrying the extension of a length substantially the same as the width of the bale band, whereby the tension of the band on the approaching sides of the buckle and upon the crossed bars will cause the side bars to straighten out and the crossed bars to overlap, and at the same time bring the hooks into engagement with the side edges of the band and the extremities of the hooks closer together than the width of the band.

5. A bale band buckle of loop form comprising an end bar, two side bars, and two other end bars formed by extensions of the side bars and constituting the entering end of the buckle, the last-mentioned end bars each terminating in a hook, and said bars crossing each other at an angle in opposite directions so as to space the hooks a distance apart greater than the width of the band, whereby the tension exerted by the band on the crossed bars will cause the crossed bars to overlap and at the same time bring the hooks into engagement with the side edges of the band.

6. A bale band buckle of loop form comprising an end bar, two side bars, and two other end bars formed by extensions of the side bars and constituting the entering end of the buckle and each terminating in a hook, the side bars approaching toward the entering end of the buckle into closer relation than the width of the bale band, and the second-named end bars crossing each other in opposite directions with the hooks spaced apart a greater distance than the width of the band, whereby the tension exerted by the band against the side bars and upon the crossed bars will cause the crossed bars to overlap and at the same time cause the hooks to approach to bring them into engagement with the side edges of the band and with the extremities of the hooks closer together than the width of the band.

In testimony that I claim the foregoing as my own, I have hereto affixed my signature in the presence of two witnesses.

HENDERSON PIRCE CHILDRESS.

Witnesses:
J. A. PARKES,
E. B. WHITE.